(12) United States Patent
Hultgreen et al.

(10) Patent No.: US 6,202,942 B1
(45) Date of Patent: Mar. 20, 2001

(54) MANURE INJECTOR SYSTEM

(75) Inventors: Gordon Hultgreen; Philip Leduc, both of Saskatchewan (CA); Corwin Puryk, Moline, IL (US)

(73) Assignee: Prairie Agricultural Machinery Institute, Humbold (CA)

( * ) Notice: Subject to any disclaimer, the term of this patent is extended or adjusted under 35 U.S.C. 154(b) by 0 days.

(21) Appl. No.: 09/408,914

(22) Filed: Sep. 30, 1999

(30) Foreign Application Priority Data

Jun. 15, 1999 (CA) ................................. 2275120

(51) Int. Cl.$^7$ ............................................. B05B 3/02
(52) U.S. Cl. .................. 239/214.15; 239/159; 239/175; 239/390; 239/562; 239/662; 137/561 A; 415/121.1
(58) Field of Search ................... 239/159, 170, 239/172, 175, 214, 214.15, 215, 216, 222, 224, 390, 391, 548, 562, 662; 137/561 A; 415/121.1, 169.1; 241/46.11, 46.17

(56) References Cited

U.S. PATENT DOCUMENTS

| | | | |
|---|---|---|---|
| 4,232,616 | * 11/1980 | Van Der Lely | 239/172 X |
| 5,271,567 | * 12/1993 | Bauer | 137/561 A X |
| 5,272,992 | 12/1993 | Barbour et al. | 111/120 |
| 5,435,493 | * 7/1995 | Houle | 239/662 X |
| 5,460,483 | * 10/1995 | Dorsch | 415/121.1 |

* cited by examiner

Primary Examiner—Patrick Brinson
Assistant Examiner—Steven J. Ganey
(74) Attorney, Agent, or Firm—Adrian D. Battison

(57) ABSTRACT

An apparatus is used for distributing a slurry flow to plural feed conduits. It has particular application in the injection of swine manure into the soil as fertilizer. The apparatus includes a circular manifold with a central inlet for delivering slurry to the manifold and outlet ports spaced around the outer wall of the manifold for connection to the respective feed conduits. An impeller in the manifold has back swept impeller blades mounted for rotation so that the impeller blades sweep in sequence past the outlet ports. The impeller blades produce pressurized zones in front of them as they sweep in sequence past the outlet ports. This produces a pulsating flow in the feed conduits, ameliorating blockage problems with the conduits. The impeller also includes knives that rotate around the inside of the outer wall and anvils mounted on the outer wall so the knives will act with the anvils to sever trash in the slurry flow. The knives and the anvils are oppositely inclined to produce a shearing action. This cutting arrangement co-operates with the pulsing flow to clear trash that might otherwise build up and plug the ports. It also reduces the size of solids that are included in the slurry, so that they will pass more readily through the feed conduits and the delivery boots used for injecting the slurry into the soil. The impeller drive is preferably an hydraulic motor mounted on the manifold.

18 Claims, 5 Drawing Sheets

MANURE INJECTOR SYSTEM

FIELD OF THE INVENTION

The present invention relates to fluid distribution and more particularly to the distribution of a slurry flow into plural outlets.

BACKGROUND

The present invention has particular, although not exclusive, use in the application of manure to an agricultural field.

Current methods of swine manure slurry application include broadcast systems which use tanker spreaders or big gun sprinklers for spreading the manure on the surface of a field. These systems result in losses of large quantities of valuable crop nutrients to the air. They also cause significant odour problems. In consequence, some injection systems have been developed, for example the system described in Barbour et al. U.S. Pat. No. 5,272,992, issued Dec. 28, 1993, to Greentrac Limited.

The injector systems are themselves prone to certain problems, generally caused by the nature of the slurry being delivered. These include non-uniform distribution of slurry to the various injectors. Solid waste storage cells can contain pig hair and other foreign materials such as plastics, as well as large amounts of odour-control straw. Consequently, the distribution manifold must be capable of handling these solids without plugging the distribution ports.

The present invention is concerned with the provision of a slurry distribution manifold that ameliorates this problem.

SUMMARY

According to the present invention there is provided an apparatus for distributing a slurry flow to a plurality of feed conduits, comprising:

a manifold having:
- an annular outer wall with a central axis;
- a manifold inlet for delivering the slurry flow to the manifold;
- a plurality of outlet ports spaced around the outer wall for connection to the respective feed conduits; and
- an impeller in the manifold, the impeller including:
  - a plurality of impeller blades;
  - means mounting the impeller blades for rotation about the axis of the outer wall, with the impeller blades sweeping in sequence past the outlet ports; and
  - means for rotating the impeller.

The impeller blades produce pressurized zones in front of them as they sweep in sequence past the outlet ports. This produces a pulsating flow in the feed conduits, ameliorating blockage problems with the conduits. This effect is augmented by the use of swept-back blades.

The impeller preferably includes knives that rotate around the inside of the outer wall and anvils mounted on the outer wall so the knives will act with the anvils to sever trash in the slurry flow. In preferred embodiments, the knives and the anvils are oppositely inclined to produce a shearing action. This cutting arrangement cooperates with the pulsing flow to clear trash that might otherwise build up and plug the ports. It also reduces the size of solids that are included in the slurry, so that they will pass more readily through the feed conduits and the delivery boots used for injecting the slurry into the soil. The impeller drive is preferably an hydraulic motor mounted on the manifold.

The ports may be formed in a replaceable orifice ring, so that port sizes can readily be altered to accommodate different flow rates.

Other aspects of the invention provide injectors for agricultural purposes including distributors as described above.

BRIEF DESCRIPTION OF THE DRAWINGS

In the accompanying drawings, which illustrate an exemplary embodiment of the present invention.

DETAILED DESCRIPTION

Figure 1:
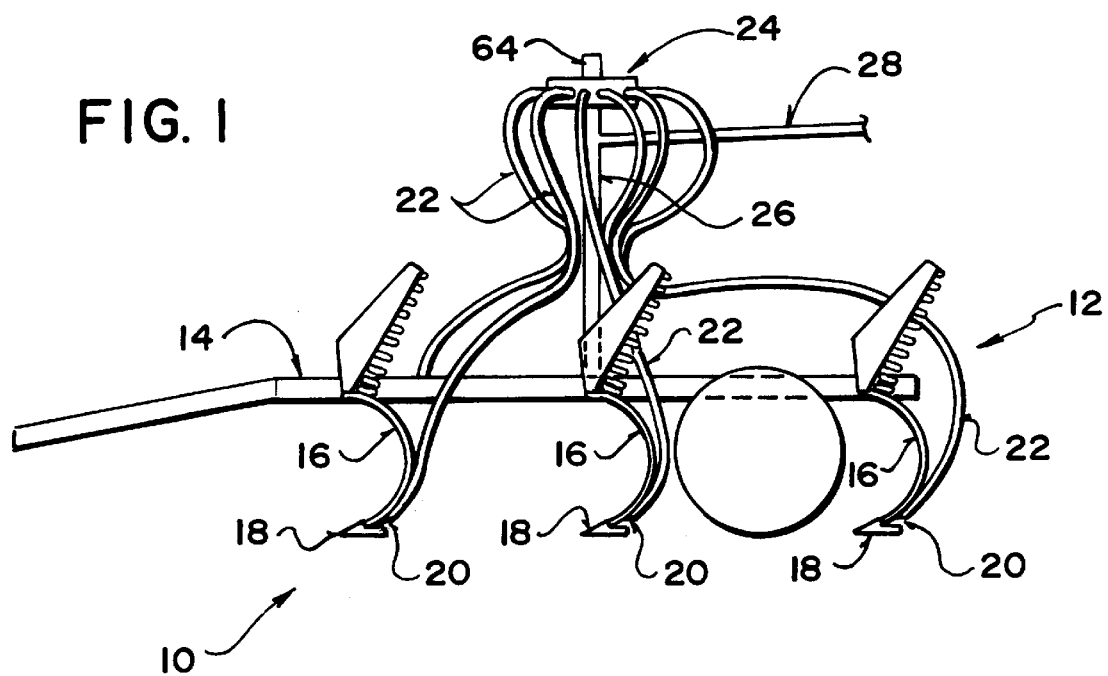
FIG. 1 is a side elevation of a cultivator equipped with an injection system according to the present invention.
Figure 2:
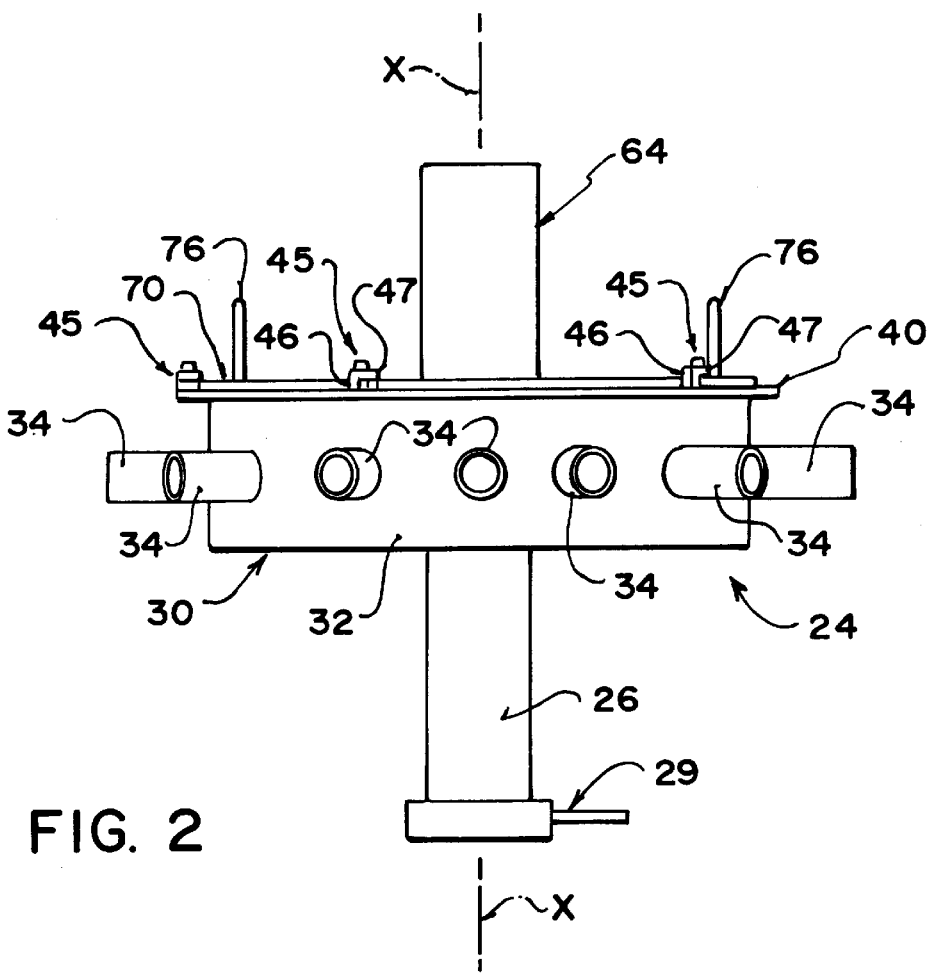
FIG. 2 is a side view of the manifold.
Figure 3:
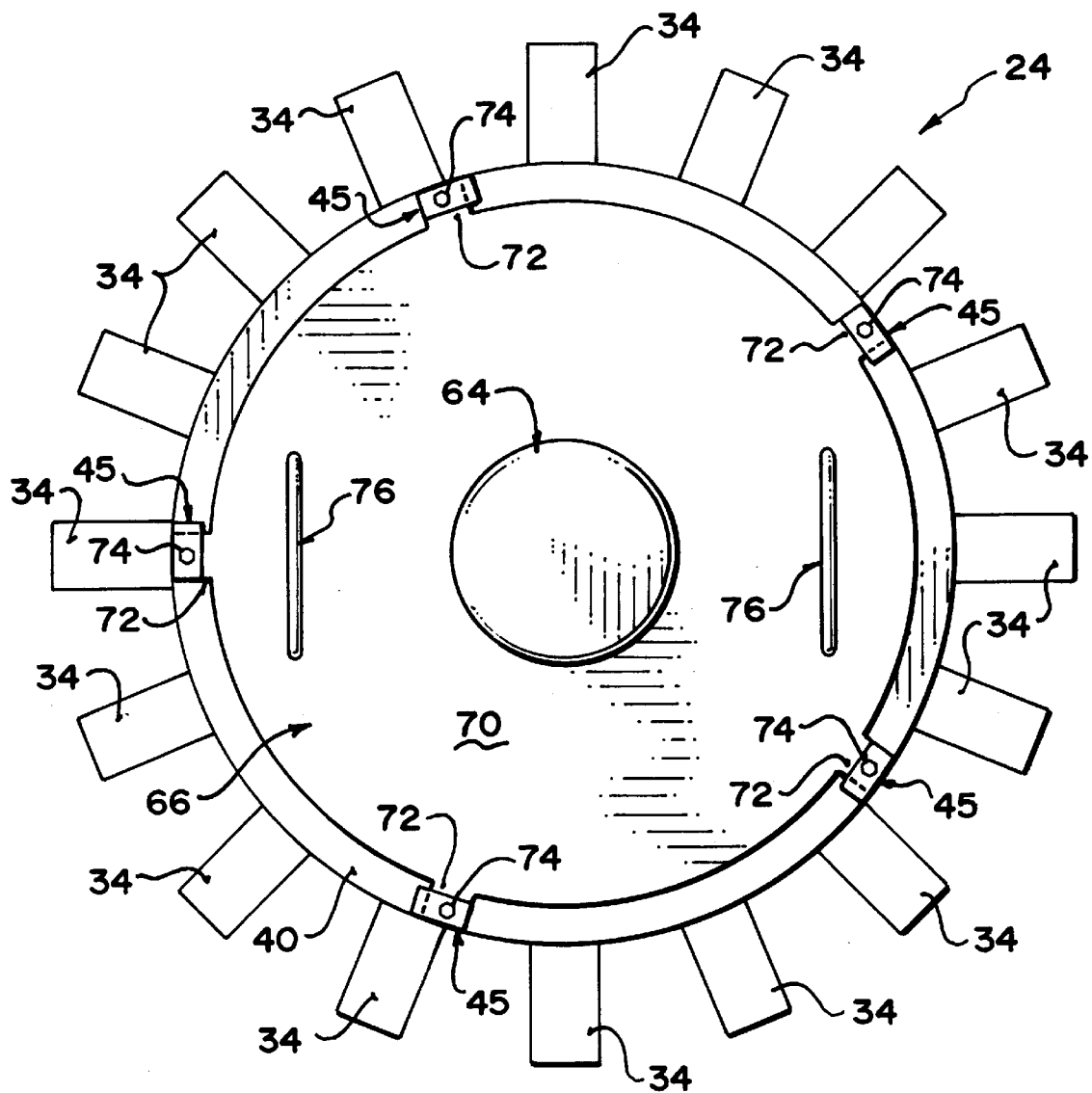
FIG. 3 is a top view of the manifold.
Figure 4:
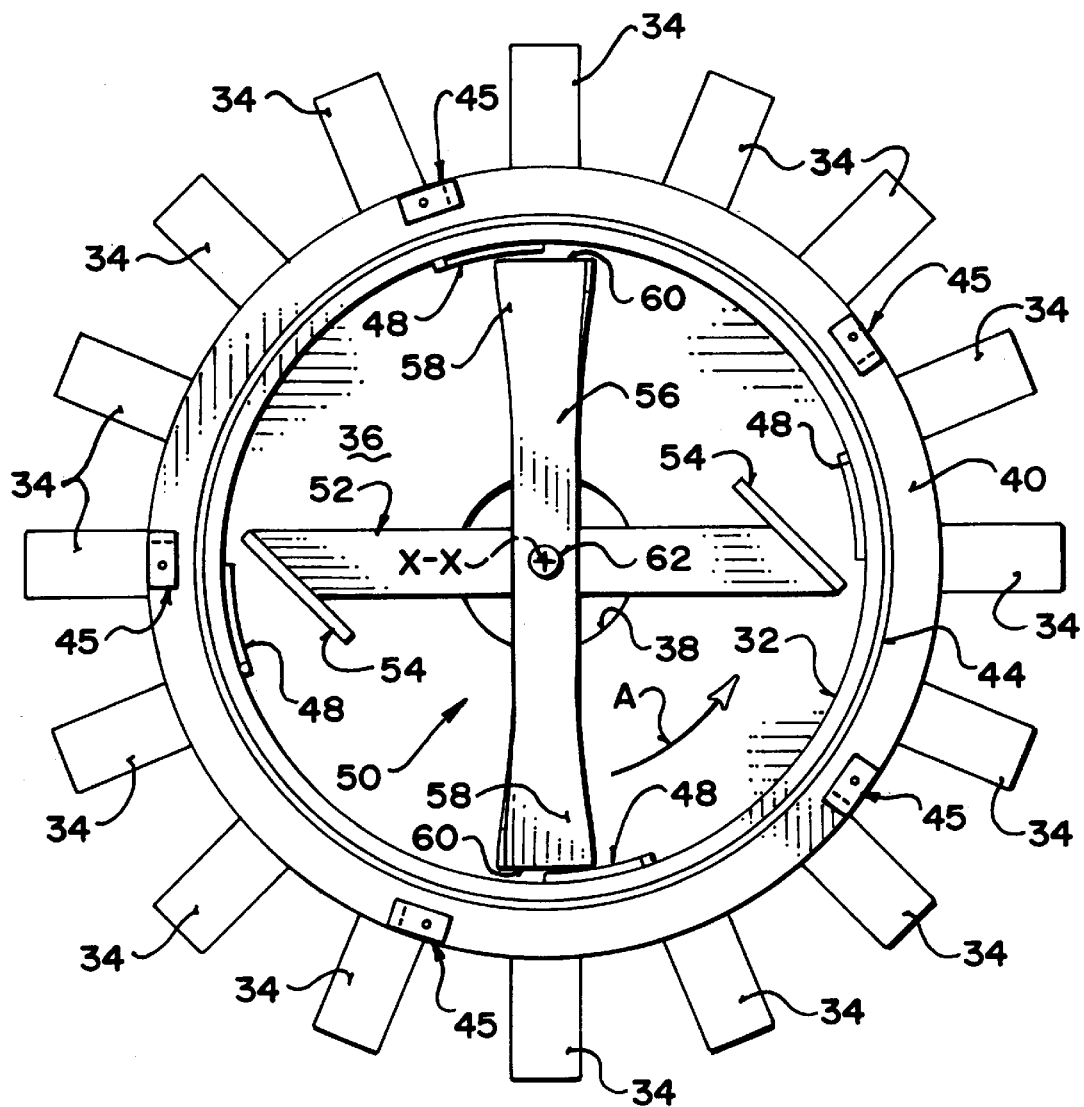
FIG. 4 is a top view of the manifold with the cover removed.
Figure 6:
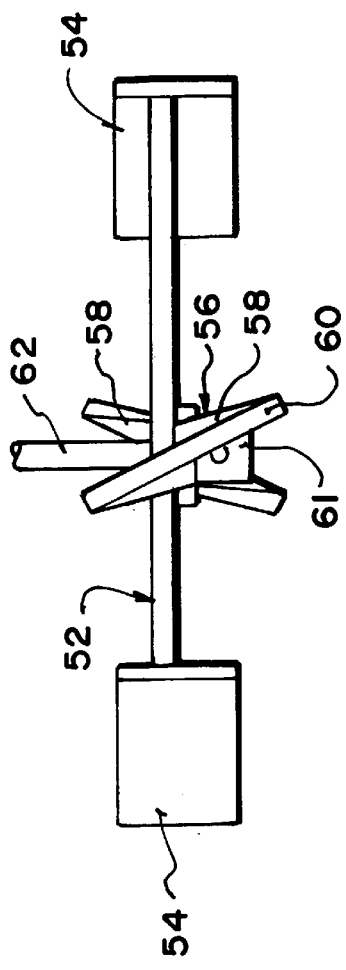
FIG. 6 is a side view of the impeller.
Figure 5:
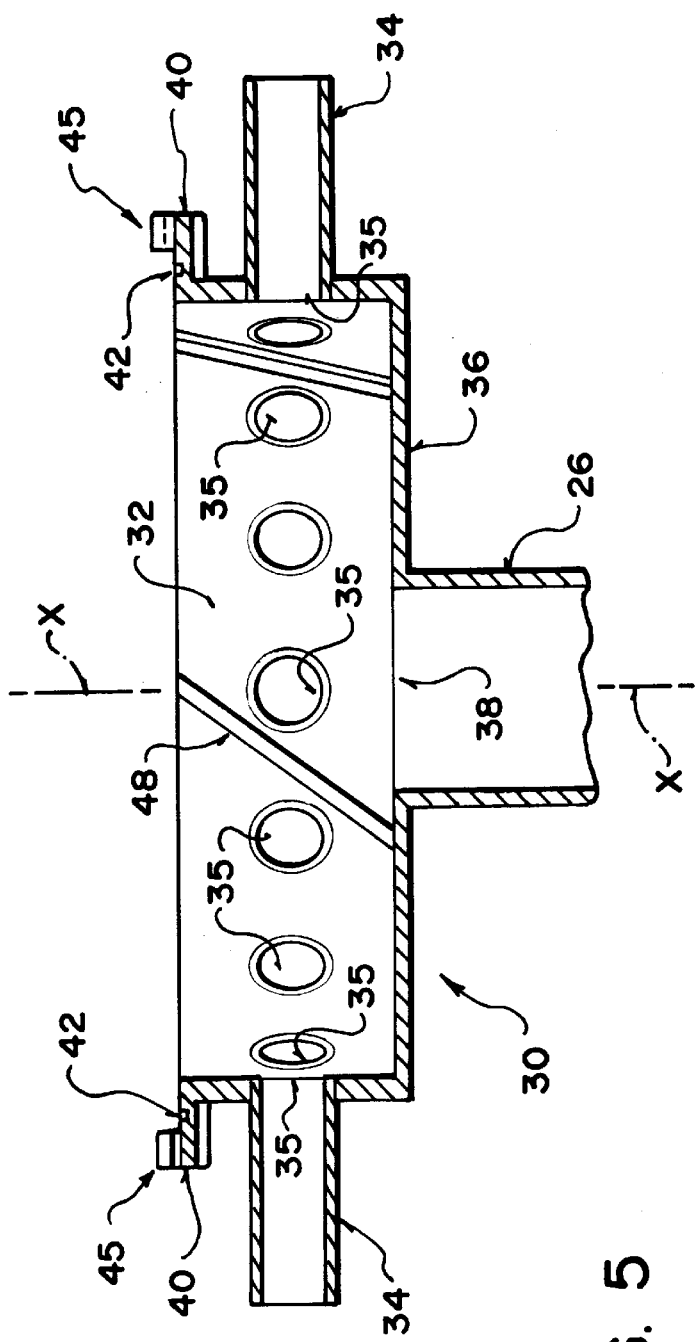
FIG. 5 is a diametric cross-section of the manifold without the cover and impeller.

Referring to the accompanying drawings, FIG. 1 illustrates an injector 10 for injecting a manure slurry into soil. It includes a cultivator 12 with a frame 14 carrying a set of cultivator shanks 16 with sweep type openers 18. On the back of each shank, behind the opener is a slurry delivery boot 20 which receives slurry from a delivery tube 22. The delivery tubes are all branched off a manifold 24 mounted on the cultivator frame 14 by a standard 26. A slurry feeder tube 28 is connected to the standard 26 to deliver a slurry through a hollow upper section of the standard by way of a gate valve 29. The supply of slurry to this feeder tube may be from any suitable system, for example a known tank or umbilical system.

The configuration of the manifold 24 is illustrated most particularly in FIGS. 2 through 7. It includes a manifold body 30 with a cylindrical outer wall 32. Sixteen tubes 34 radiate from the wall 32 and open to its interior through respective ports 35. The bottom of the manifold body is a base plate 36 with a central inlet 38 receiving fluid from the hollow standard 26.

At the top of the manifold body is an annular lid retainer flange 40 that surrounds the open top of the manifold body. A groove 42 is formed in the retainer flange to accommodate an o-ring seal 44. Spaced around the retainer flange and projecting from its top surface are hook-shaped retainers 45 with upright radial parts 46 projecting upwardly from the top of the retainer flange adjacent its periphery and horizontal retainer plates 47 that project tangentially from the radial parts 46, all in the same circumferential direction.

Within the manifold body are four shear anvils 48. These are metal bars projecting from the inner cylindrical surface of the cylindrical wall 32. They are uniformly spaced around the inside of the manifold and each is inclined with respect to the central axis x-x of the manifold body.

An impeller 50 is located within the manifold body to rotate about the axis x-x. It includes a pump arm 52 that extends diametrically across the interior of the manifold body and carries pumping plates 54 at its opposite ends. Each plate is inclined with respect to the pump arm and slopes towards the cylindrical wall 32 in a direction opposite the direction of rotation illustrated by the arrow A. The impeller also includes a knife arm 56 that is a flat plate with widened ends forming blades 58. Between the centre of the plate and the blades, the knife arm is twisted so that the blade ends 60 are inclined with respect to the manifold axis x-x. The inclination is opposite to that of the anvils 48 so that there will be a scissors-like shearing action between the blade end 60 and the anvils 48 as the impeller rotates.

To drive the impeller, it has a mounting collar 61 mounted on the end of an impeller shaft 62. The shaft is an extension of the output shaft of an hydraulic motor 64 mounted on a manifold lid 66. The lid includes a locator disc (not shown) mounted on the underside of a top disc 70. The locator disc fits into the top of the manifold body to centre the lid on the cylindrical wall 32. The top disc projects radially over the lid retainer flange 40 to engage the O-ring seal 44. Lugs 72 project from the periphery of the lid top disc to engage under the retainers 45, where they are held in place with fasteners 74.

On opposite sides of the motor 64, the lid is equipped with two U-shaped rod handles 76.

In use of the manifold, slurry is supplied to the manifold through the inlet 38 in the base plate. The impeller is rotated within the manifold body. A pressurized zone is created in front of each of the pump plates 54 so that as each plate approaches and passes a discharge port in the cylindrical wall 32 it produces a pressure pulse tending to pump material into the port. The knives and anvils coact to shear and break up solid materials in the slurry that may tend to block the outlet orifices, so that smaller components of the solid materials can be delivered through the orifices and the delivery tubes using the pulsating action of the pumping blades.

Figure 7:
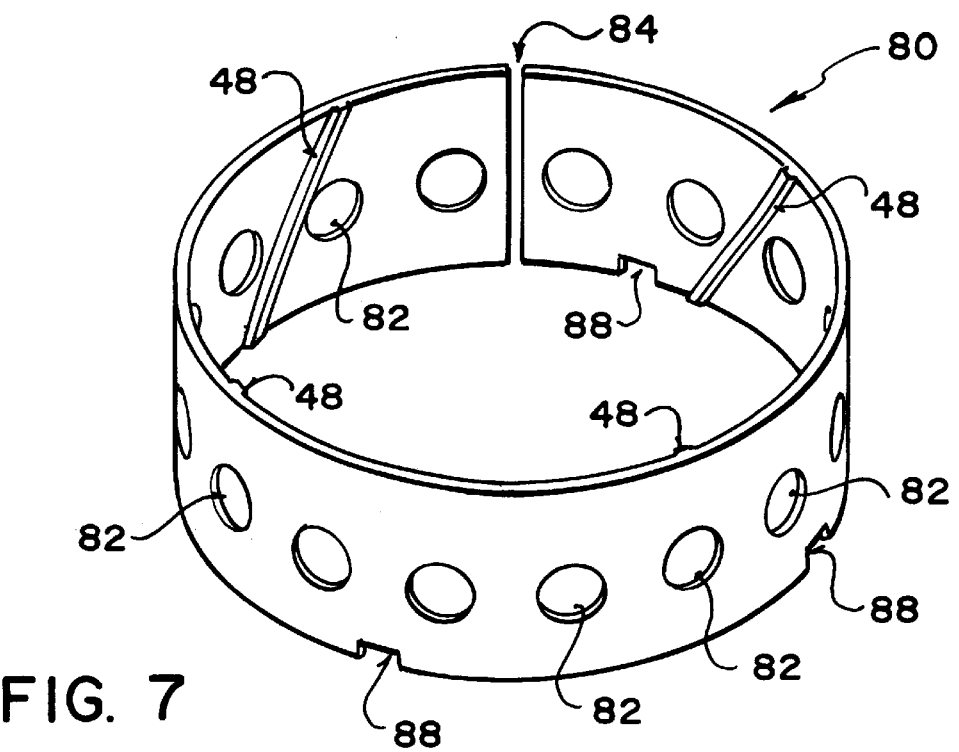
FIG. 7 is an isometric of an orifice ring.
Figure 8:
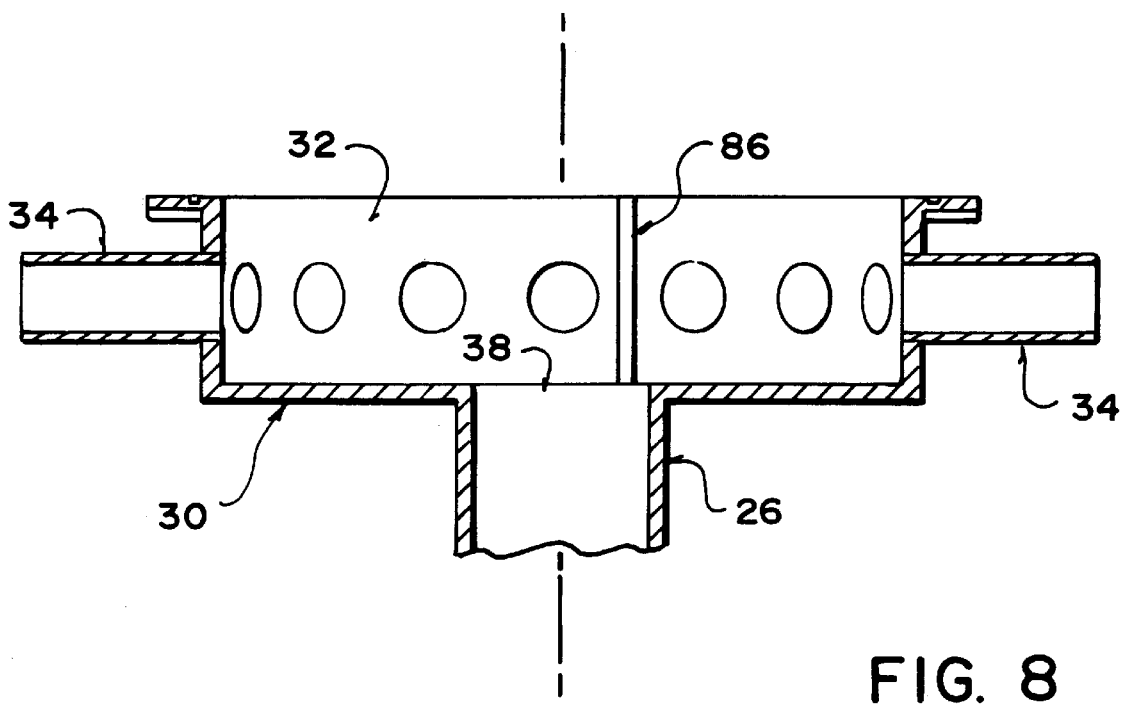
FIG. 8 is a cross section of a manifold housing for use with the orifice ring.

In some cases it may be desirable to change the orifice sizes to accommodate different slurries or different feed rates. This may be accomplished using a replaceable orifice ring 80 as illustrated in FIG. 7. The orifice ring has orifices 82 formed in it to align with the ends of the respective outlet tubes 48 when the ring is inserted into the manifold body. To ensure proper alignment, the ring has an axial slot 84 that engages a mating key 86 along the inner surface of the manifold body. In this embodiment the shear anvils 48 are part of the ring 80 and project from its inner surface. Notches 88 along the bottom edge of the ring 80 are used for removing the ring from the manifold.

By virtue of the pumping action of the manifold and the shearing action of the knives carried by the impeller, the manifold is able to provide a more uniform distribution of flow through all of the outlet ports without the plugging that can occur with known manifolds that provide only a distribution function and neither a pumping nor a cutting action within the manifold.

While particular embodiments of the invention have been described in the foregoing, it is to be understood that other embodiments are possible within the scope of the invention and are intended to be included herein. It is also to be understood that the manifold, while described in connection with a manure slurry injector system, is also capable of handling other types of slurries where similar types of problems arise. The invention is therefore to be considered limited solely by the scope of the appended claims.

What is claimed is:

1. An apparatus for distributing a slurry flow to a plurality of feed conduits, comprising:
    a manifold having:
        an annular outer wall with a central axis;
        a manifold inlet for delivering the slurry flow to the manifold;
        a plurality of outlet pots spaced around the outer wall for connection to the respective feed conduits; and
    an impeller in the manifold, the impeller including:
        a plurality of impeller blades converging towards the outer annular wall in one direction;
        means mounting the impeller blades for rotation about the axis of the outer wall, with the impeller blades sweeping in sequence past the outlet ports; and
    means for rotating the impeller in a direction opposite the direction in which the impeller blades converge towards the outer annular wall.

2. An apparatus according to claim 1 including a plurality of anvils mounted on an inner annular surface of the outer wall and wherein the impeller includes a plurality of knives with outer edges that sweep past the anvils with rotation of the impeller for severing solid material between the knives and the anvils.

3. An apparatus according to claim 2 wherein the anvils are inclined with respect to the axis of the outer wall.

4. An apparatus according to claim 3 wherein the outer edges of the knives are inclined with respect to the axis of the outer wall, the inclination being opposite in direction to the inclination of the anvils.

5. An apparatus according to claim 1 including flow control means for varying the size of the outlet ports.

6. An apparatus according to claim 5 wherein the flow control means comprise a ring within the manifold around an inside face of the outer wall and a plurality of orifices in the ring aligned with the respective outlet ports.

7. An apparatus according to claim 6 including a plurality of anvils mounted on the ring and wherein the impeller includes a plurality of knives with outer edges that sweep past the anvils with rotation of the impeller for severing solid material between the knives and the anvils.

8. An apparatus according to claim 7 wherein the anvils are inclined with respect to the axis of the outer wall.

9. An apparatus according to claim 8 wherein the outer edges of the knives are inclined with respect to the axis of the outer wall, the inclination being opposite in direction to the inclination of the anvils.

10. An apparatus for distributing a slurry flow to a plurality of feed conduits, comprising:
    a manifold having:
        an annular outer wall with an inner annular surface and a central axis;
        a manifold inlet for delivering the slurry flow to the manifold;
        a plurality of outlet ports spaced around the outer wall for connection to the respective feed conduits;
        a plurality of anvils mounted on the inner annular surface outer wall; and
    an impeller in the manifold, the impeller including:
        a plurality of knives with respective outer edges;
        means mounting the knives with the outer edges at fixed radial positions with respect to the axis of the outer wall and for rotation about the axis of the outer wall, with the outer edges of the knives sweeping past the anvils for severing solid material between the knives and the anvils, with the outer edges of the knives inclined with respect to the anvils; and
    means for rotating the impeller.

11. An apparatus according to claim 10 wherein the anvils are inclined with respect to the axis of the outer wall.

12. An apparatus according to claim 10 wherein the outer edges of the knives are inclined with respect to the axis of the outer wall.

13. An apparatus according to claim 10 wherein the anvils and the outer edges of the knives are inclined with respect to the axis of the outer wall the inclination of the knives being opposite in direction to the inclination of the anvils.

14. An apparatus for distributing a slurry flow to a plurality of feed conduits, comprising:
- a manifold having:
  - an annular outer wall with a central axis;
  - a manifold inlet for delivering the slurry flow to the manifold;
  - a plurality of outlet ports spaced around the outer wall for connection to the respective feed conduits;
  - flow control means for varying the size of the outlet ports; and
- an impeller in the manifold, the impeller including:
  - a plurality of impeller blades;
  - means mounting the impeller blades for rotation about the axis of the outer wall, with the impeller blades sweeping in sequence past the outlet ports; and
- means for rotating the impeller.

15. An apparatus according to claim 14 wherein the flow control means comprise a ring within the manifold around an inside face of the outer wall and a plurality of orifices in the ring aligned with the respective outlet ports.

16. An apparatus according to claim 15 including a plurality of anvils mounted on the ring and wherein the impeller includes a plurality of knives with outer edges that sweep past the anvils with rotation of the impeller for severing solid material between the knives and the anvils.

17. An apparatus according to claim 16 wherein the anvils are inclined with respect to the axis of the outer wall.

18. An apparatus according to claim 17 wherein the outer edges of the knives are inclined with respect to the axis of the outer wall, the inclination being opposite in direction to the inclination of the anvils.

* * * * *